(12) United States Patent
Fassbender et al.

(10) Patent No.: US 8,201,888 B2
(45) Date of Patent: Jun. 19, 2012

(54) VEHICLE SEAT FITTING

(75) Inventors: Frank Fassbender, Coburg (DE); Oliver Steffen, Coburg (DE)

(73) Assignee: Brose Fahrzeugteile GmbH & Co. Kommanditgesellschaft, Coburg (DE)

( * ) Notice: Subject to any disclaimer, the term of this patent is extended or adjusted under 35 U.S.C. 154(b) by 170 days.

(21) Appl. No.: 12/421,430

(22) Filed: Apr. 9, 2009

(65) Prior Publication Data
US 2009/0302658 A1 Dec. 10, 2009

(30) Foreign Application Priority Data
Apr. 11, 2008 (DE) .................. 10 2008 018 624

(51) Int. Cl.
*B60N 2/02* (2006.01)
(52) U.S. Cl. .................................. 297/367 L
(58) Field of Classification Search ............. 297/367 R, 297/367 L
See application file for complete search history.

(56) References Cited

U.S. PATENT DOCUMENTS

| | | | | |
|---|---|---|---|---|
| 5,779,313 | A * | 7/1998 | Rohee ...................... | 297/367 R |
| 6,164,723 | A * | 12/2000 | Ganot ...................... | 297/378.12 |
| 6,626,495 | B2 * | 9/2003 | Okazaki et al. ............ | 297/367 R |
| 6,648,414 | B2 | 11/2003 | Ikegaya et al. | |
| 6,726,281 | B2 * | 4/2004 | Baloche .................... | 297/367 R |
| 6,824,216 | B2 | 11/2004 | Uramichi | |
| 7,188,905 | B2 * | 3/2007 | Ham ......................... | 297/367 R |
| 7,360,838 | B2 * | 4/2008 | Smuk ........................ | 297/367 R |
| 7,490,907 | B2 * | 2/2009 | Nagura et al. ............ | 297/367 R |
| 2004/0036338 | A1 * | 2/2004 | Lardais et al. ............ | 297/367 |
| 2005/0035640 | A1 * | 2/2005 | Shinozaki ................. | 297/367 |
| 2006/0145523 | A1 * | 7/2006 | Yamada .................... | 297/367 |
| 2007/0145800 | A1 * | 6/2007 | Thiel et al. ............... | 297/367 |

FOREIGN PATENT DOCUMENTS

| | | |
|---|---|---|
| DE | 44 41 159 A1 | 5/1995 |
| DE | 10 2004 035 599 B3 | 1/2006 |
| DE | 10 2006 009 976 A1 | 9/2006 |

* cited by examiner

*Primary Examiner* — Peter R. Brown
(74) *Attorney, Agent, or Firm* — Muncy, Geissler, Olds & Lowe, PLLC

(57) ABSTRACT

A fitting is specified, in particular for a vehicle seat, which has a first fitting part and a second fitting part that is rotatable around a rotary axis relative to the first fitting part, and which has at least one safety bolt that is movably guided in the radial direction on the first fitting part for the purpose of forming an interlock with the second fitting part. According to a first variant, at least one rotatable actuating cam is provided for radially supporting the safety bolt, which has outer, middle and inner support surfaces running in the circumferential direction, the support surfaces each having a radial offset relative to each other, and the step between the middle and the outer support surfaces forming a stop against the safety bolt. According to a further variant, fitting has an engagement means for retracting the safety bolt, which is designed as a link guiding the safety bolt, which includes a radial limiting surface that acts as a stop in interaction with the safety bolt. A fitting of this type is effectively protected against over-rotation.

14 Claims, 5 Drawing Sheets

VEHICLE SEAT FITTING

This nonprovisional application claims priority under 35 U.S.C. §119(a) to German Patent Application No. DE 10 2008 018 624.4, which was filed in Germany on Apr. 11, 2008, and which is herein incorporated by reference.

BACKGROUND OF THE INVENTION

1. Field of the Invention

The invention relates to a fitting, in particular for a vehicle seat, which comprises a first fitting part, a second fitting part that is rotatable around a rotary axis relative to the first fitting part, and a safety bolt that is movably guided in a radial sliding direction on the first fitting part for the purpose of establishing an interlock with the second fitting part.

2. Description of the Background Art

A fitting of this type is used, in particular, for the positionable adjustment of a vehicle seat back relative to a lower seat part. For this purpose, the safety bolt is first moved, for example by an actuating lever, from its locked position, in which the two fitting parts are locked together. The fitting parts are then rotated toward each other, in particular by adjusting the inclination of the connected seat back, until a desired target position is reached, and the actuating lever is released. As a result of a mechanical pretension relative to the locked position, the safety bolt subsequently returns to its starting position, so that the two fitting parts are now locked together in the target position. The seat back inclination is then adjusted, and the back is locked relative to the lower seat part.

A fitting of the type mentioned above is known, for example, from DE 10 2004 035 599 B3. The safety bolt in this document is movably guided on the first fitting part in the radial direction and has a plurality of locking teeth on its outer radial end, which engage with corresponding teeth of the second fitting part for the purpose of establishing an interlock. Fittings of this type are further described in DE 44 41 459 A1 and U.S. Pat. No. 6,824,216 B2. Different drive concepts for operating the safety bolt are disclosed in the cited documents.

To actuate the safety bolt between a locked position and a released position, in which the two fitting parts may move freely relative to each other, a drive element is known, for example from DE 44 41 159 A1, which includes an actuating cam and a retracting pawl. The actuating cam is supported radially against an end of the bolt and drives the safety bolt radially to the outside and into its locked position. The retracting pawl engages with a corresponding recess in the safety bolt and retracts the safety bolt from its locked position radially inward into its released position. By alternately actuating the drive element in opposite directions of rotation, the safety bolt may be moved back and forth between its locked and released positions.

A drive element for driving the safety bolt is provided in U.S. Pat. No. 6,824,216 B2, in which a separate driving cam drives a sliding element at right angles to the direction of safety bolt adjustment. The sliding element has a retracting pawl as well as stop ramps, a lateral driving motion causing the stop ramps to interact with the retracting pawl and thereby move the safety bolt back and forth.

According to DE 10 2004 035 599 B3, a separate eccentric disk and a separate link disk are provided to actuate the safety bolt. The eccentric disk drives the safety bolt radially to the outside and into its locked position. The link disk interacts with a trunnion of the safety bolt and drags the safety bolt back from its locked position radially inward into its released position.

A fitting is also known from U.S. Pat. No. 6,648,414 B2, in which a rotatably mounted safety bolt is switched between a locked position and a released position by a rotatable actuating cam. For this purpose, the actuating cam has corresponding support surfaces running in the circumferential direction. A middle support surface, viewed in the radial direction, acts to lift the safety bolt from its locked position to its released position.

A fitting is further known from DE 10 2006 009 976 A1, in which a link disk is proposed for actuating the safety bolt, the link disk interacting with an actuating cam to retract the safety bolt from its locked position radially to the inside and into its released position.

Different approaches for preventing over-rotation of the fitting in both directions are known from the prior art. In particular, it is necessary to implement a stop in such a way that the introduction of forces in the closing direction of actuation does not cause the fitting to over-rotate and thus possibly to be irreversibly damaged. A problem of this type occurs, for example, when unintentionally stepping on the fitting actuating lever, which is usually oriented horizontally, while loading a roof-mounted luggage rack.

SUMMARY OF THE INVENTION

It is therefore an object of the present invention to provide a fitting of the type specified above in such a way that over-rotation of the fitting parts relative to each other is avoided as reliably as possible. This is to be done using simple means and without increasing the physical volume.

Therefore, according to a first variant of a fitting of the type specified above, at least one rotatable actuating cam is provided to radially support the safety bolt, the actuating cam including an outer, a middle and an inner support surface running in the circumferential direction, the support surfaces each having a radial offset relative to each other, the step between the middle and outer support surfaces being designed as a stop for the safety bolt.

In this embodiment of the actuating cam, a support of the safety bolt on the middle support surface corresponds to the locked position and a support on the inner support surface corresponds to the released position, provided that the bolt is moved radially to the outside and into its locked position. The additional outer support surface is used to define a stop for the safety bolt. This effectively prevents the fitting parts from continuing to rotate in the closing direction of actuation. The actuating cam, which performs an outward driving action even in the locked position of the safety bolt, reliably withstands the introduction of strong forces. If multiple safety bolts are provided, this also serves to center the driving element including actuating cam.

Due to the fact that an additional outer support surface is assigned to the actuating cam, a secure end stop that prevents the fitting parts from continuing to rotate in the closing direction of actuation may be provided without requiring additional physical volume.

The step between the radially outer support surface and the middle support surface is suitably steeper than the step between the middle support surface and the inner support surface and, as such, acts as a secure stop for the safety bolt. In particular, the step is designed with a degree of steepness, such that an automatic interlock is achieved. The step between the middle support surface and the inner support surface has a flatter design for this purpose. The safety bolt slides along this step during a driving motion between the locked and the released positions. In other words, the latter step produces the radial offset of the safety bolt, which is necessary in order to open and lock the fitting.

The actuating cam is advantageously made of a hardened material, in particular a hardened steel. The actuating cam or the driving element carrying the actuating cam may be manufactured, in particular, by sintering and hardened accordingly.

The safety bolt is preferably guided in parallel between a first and a second guide element on the first fitting part, the two guide elements having a mirror-symmetrical design in relation to each other, and the outer support surface of the actuating cam merging with a radial contact surface, thereby forming a stop for a radially inside end of one of the guide elements. Due to this embodiment of the actuating cam, a stop with regard to the opening direction of actuation is simultaneously achieved. The actuating cam strikes the inner end of each guide element by its outer support surface and by the wall forming the radial contact surface. Due to the mirror-symmetrical design of the guide elements, two chirally oriented fittings are achieved by the fact that the actuating cam or the driving element carrying the actuating cam is rotated 180 degrees when integrated into the fitting. To produce two chiral fittings, which is necessary for installation on both sides in a vehicle seat while maintaining the same direction of actuation, different variants are therefore not required.

An end of a spring element suitably engages with the radial contact surface for the purpose of pretensioning the actuating cam. This produces a pretension of the actuating cam in the closing direction, the contact surface for the end of the spring element simultaneously forming a stop in the opening direction of actuation.

The outer support surface also preferably merges with the radial contact surface via a radius, such that the spring element is located between the end of the guide element and the radius area when a stop is achieved. Upon achieving a stop, a distribution of force to the clamped end of the spring element is produced. This achieves a particularly reliable stop. In particular, the force is distributed by the intermediate position of the spring element, thereby avoiding points of stress on the guide elements or the actuating cam. Due to this design, the spring excursion, and thus the counterforce perceptible during actuation, may be optimized as a function of the actuating distance.

In a further preferred embodiment, the safety bolt includes a cam for support against the actuating cam at its radially inner end. This embodiment permits a certain radial structural clearance with regard to the interaction between the end of the safety bolt and the outer surfaces of the actuating cam.

In addition, the radially inside ends of the guide elements are preferably situated closer to the rotary axis, opposite the inner end of the safety bolt. Due to this embodiment, the stop for the actuating cam on the guide elements may be optimized within the actuating angle.

It is also advantageous if the fitting includes a rotatably mounted engagement means for retracting the safety bolt. An engagement means of this type, which retracts the safety bolt, may, in principle, be of any design. For example, it may be designed as a hook or pawl that interacts with a correspondingly designed matching piece of the safety bolt. The retracting means may also be designed as a trunnion that interacts with a corresponding recess or track of the safety bolt.

The engagement means is advantageously designed as a link that guides the safety bolt. A link of this type is used to guide the safety bolt along a predefined path. The link may be formed for this purpose, in particular, by a groove, a web or a corresponding recess, the safety bolt having coupling means that is complementary thereto. In particular, the link is implemented by an opening whose wall corresponds, for example, to a trunnion of the safety bolt, thereby implementing the desired automatic guidance. In a complementary embodiment, the link is provided by a groove, path or opening impressed into the safety bolt, with which a trunnion of the driving element engages.

In a further advantageous embodiment, the link includes a radial limit surface that acts as a stop in interaction with the safety bolt. Over-rotation of the fitting parts relative to each other is also prevented by a stop of this type, which may be additionally or alternatively provided with one of the aforementioned stops formed by the actuating cam. The radial limiting surface may be provided on both sides of the link. This prevents over-rotation of the fitting both in the opening direction of actuation and in the closing direction of actuation.

According to the second independent variant, a fitting is provided, which has a first fitting part, a second fitting part that is rotatable around a rotary axis relative to the first fitting part, and a safety bolt that is movably guided in a radial direction on the first fitting part for establishing an interlock with the second fitting part. At least one rotatably mounted engagement means for retracting the safety bolt is provided, which is designed as a link guiding the safety bolt, the link having a radial limiting surface that acts as a stop in interaction with the safety bolt when the engagement means is actuated in the opening direction.

Due solely to the specified link, over-rotation of the fitting parts relative to each other is reliably prevented without requiring additional space.

As mentioned above, the rotatably mounted engagement means and the rotatably mounted actuating cam may also be reasonably combined in a fitting, a corresponding stop being achieved by the two driving elements. An embodiment is preferred, in which a stop in the closing direction of actuation is achieved by the actuating cam and a stop in the opening direction of actuation is achieved by the engagement means. A stop formed by providing a step on the actuating cam in the closing direction of actuation withstands the introduction of stronger forces than does a stop implemented by the engagement means in the form of a link.

In a particularly preferred embodiment, the engagement means and the actuating cam are situated together on a base member of a driving element. Due to this embodiment, the location of the engagement means and the actuating cam relative to each other is fixed. Due to this fixing, the actuation clearance of the fitting is reduced.

In a further preferred embodiment, the engagement means and the actuating cam are located on the base member at a distance from each other in the axial direction. This makes it possible to overlap both elements in the radial direction, thereby reducing physical space in the circumferential direction. In this manner, it is possible to situate multiple actuating cams and engagement means in the circumferential direction, even if small dimensions are achieved in the radial direction, so that multiple safety bolts may be actuated. By reducing the physical space and, in particular, reducing the radial dimensions, it is therefore possible to achieve a secure fitting.

In a further suitable embodiment, the base member has an elevated base, the edge area of which forms the actuating cam. This form, which is easy to implement from a manufacturing perspective, also makes it possible to simultaneously design the engagement means and, in particular, the link as areas of the actuating cam. In particular, an outer surface of the base, which simultaneously forms the actuating cam, may also form a wall of the link.

Further scope of applicability of the present invention will become apparent from the detailed description given herein-after. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
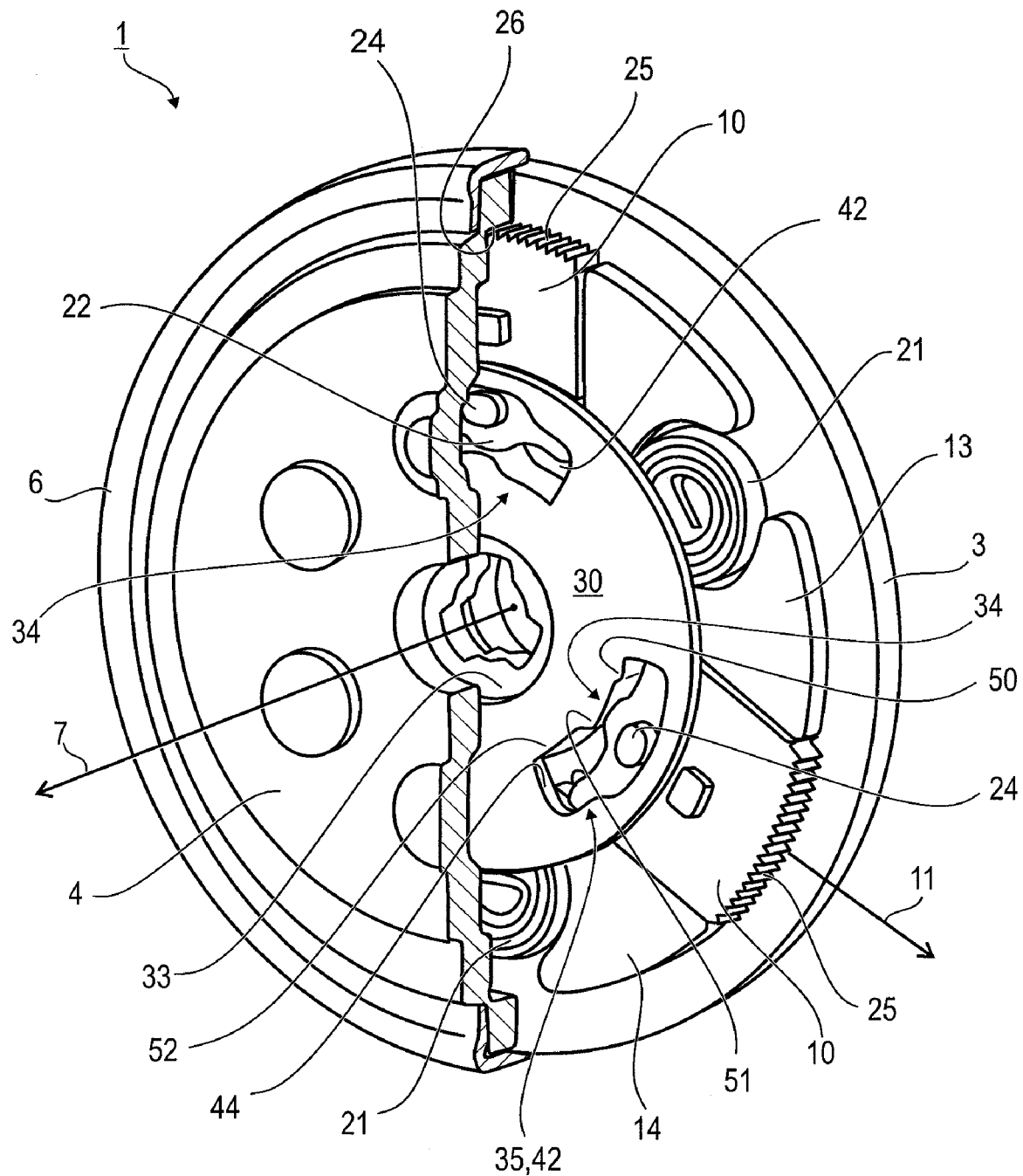
FIG. 1 shows a partially exploded view of a fitting having three safety bolts that are guided between symmetrical guide elements.

FIG. 1 shows a partially exploded view of a fitting 1 for adjusting the back of a vehicle seat relative to a lower seat part. Fitting 1 includes a first fitting part 3 and a second fitting part that is rotatable relative thereto, only half of which is shown. First and second fitting parts 3 and 4 are held against each other in a rotationally movable manner by a retaining ring 6. Rotary axis 7 is visible inside fitting 1. A total of three safety bolts 10 are each movably guided in a radial guiding direction 11 on first fitting part 3. Each safety bolt 10 is guided in parallel between a first guide element 13 and a second guide element 14. The two guide elements 13, 14 are designed to be mirror-symmetrical with regard to each other. Spring elements 21 in the form of spiral springs are inserted between each of two adjacent guide elements 13 and 14.

In the illustrated position, all safety bolts 10 are pressed radially to the outside and into their locked position by a mechanical pretension applied by spring elements 21. A plurality of locking teeth 25, which mesh with teeth 26 on the inner circumference of second fitting part 4, are situated on the radially outside end of each safety bolt 10 in order to establish an interlock with second fitting part 4. Each safety bolt 10 is thus shaped to form a ratchet locking mechanism for second fitting part 4. A centered cam 22 is situated on the radially inside end of each safety bolt 10. A trunnion 24 is also molded onto each safety bolt 10.

To actuate fitting 1, the latter includes an inside driving element 30, which is essentially formed by a central, disk-shaped base member 33. A central receptacle for positive connection to a drive shaft (not shown) is located inside base member 33.

A total of three actuating cams 34, against which respective cams 22 of safety bolts 10 are supported radially to the inside, are situated on base member 33 in the circumferential direction. Therefore, actuating cams 34 cause safety bolts 10 to be driven radially to the outside and into their locked position. According to FIG. 1, this movement of safety bolts 10 to the outside takes place during a counterclockwise rotation of driving element 30.

A total of three engagement means 35 is also introduced into base member 33 for retracting safety bolt 10 from its locked position to a released position situated farther to the inside in the radial direction. Each engagement means 35 is formed by the limiting surfaces of a link 42 implemented as an opening. It is apparent that trunnions 24 of safety bolts 10 each interact with the outer limiting surfaces of links 42. The outer limiting surfaces of links 42 each have a radial offset, so that safety bolts 10 are each pulled inwardly into their released position during a rotary motion of driving element 30 in the counterclockwise direction. Insofar, an automatic guidance of safety bolts 10 is achieved by links 42.

It is further apparent that the contour of actuating cams 34 partially corresponds to the contour of the outer limiting surface of corresponding links 42. This makes it possible to move safety bolts 10 back and forth by rotating driving element 30. The fact that engagement means 35 and actuating cams 34 at least partially overlap in the radial direction makes it possible to save physical space in the circumferential direction. In particular, this allows multiple safety bolts 10 to be provided.

Each of actuating cams 34 has an outer support surface 50, a middle support surface 51 and an inner support surface 52. In the illustrated position, safety bolts 10 are each supported by their cams 22 on middle support surface 51 of actuating cams 34. This position corresponds to the locked position of safety bolts 10. When driving element 30 continues to rotate in the clockwise direction, each cam 22 runs on a step that is formed between middle support surface 51 and outer support surface 50. This step forms a stop in the closing direction of actuation. Sturdy base member 33 of driving element 30 makes it possible to provide a stable stop, so that fitting 1 withstands high loads in the closing direction of actuation.

Each of links 42 also has a radial limiting surface 44, against which trunnion 24 of each assigned safety bolt 10 comes to rest when driving element 30 is rotated in the clockwise direction. This provides a stop for the opening direction of actuation.

Figure 2:
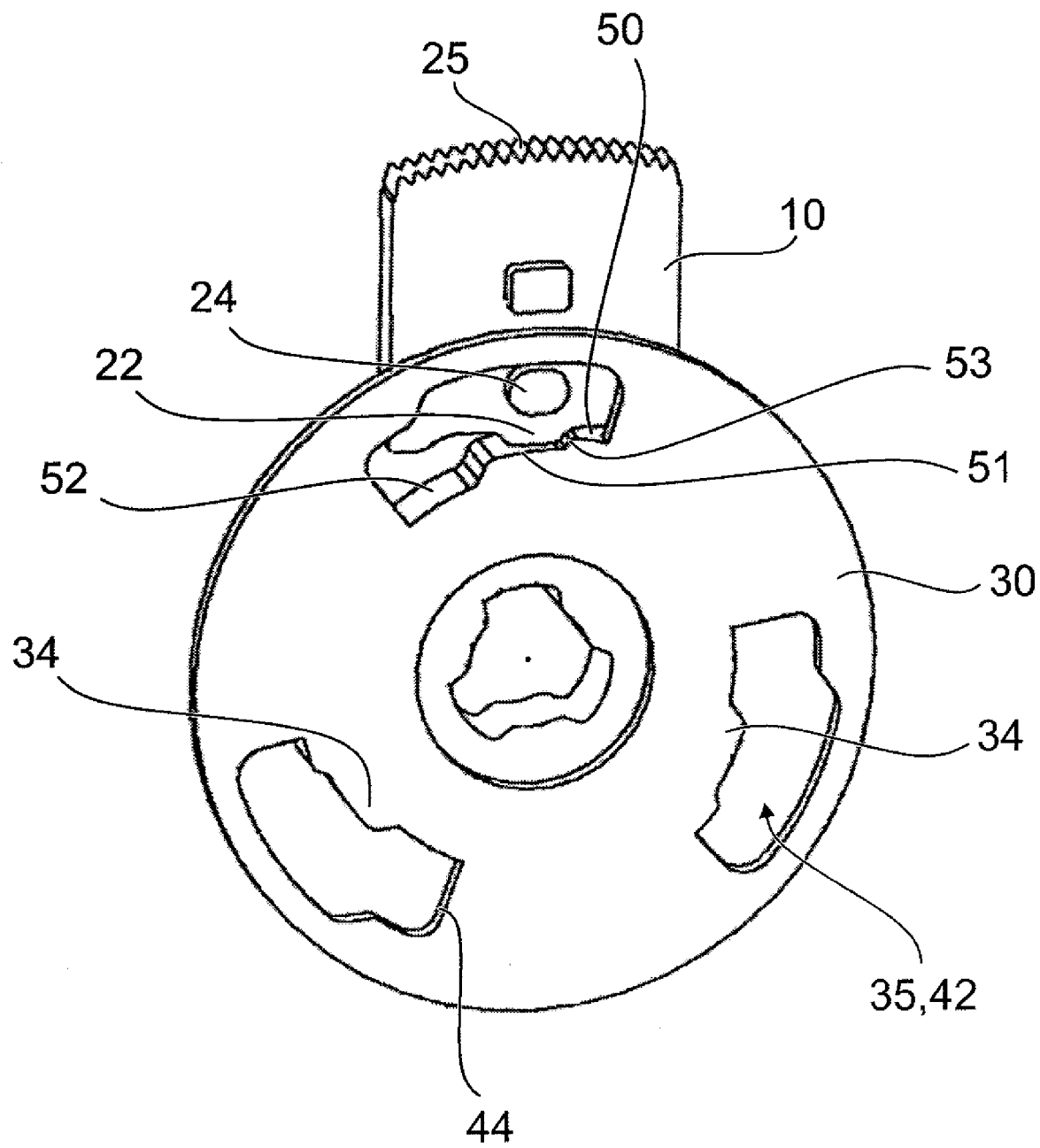
FIG. 2 shows a reduced representation of the position of a driving element in relation to a safety bolt in a locked position.

FIG. 2 shows a reduced representation of the position of driving element 30 according to FIG. 1 relative to a safety bolt 10 when safety bolt 10 is located in a locked position. It is apparent that, in this position, cam 22 of safety bolt 10 is supported against a middle support surface 51 of actuating cam 34. In this position, safety bolt 10 is therefore located in its radially outside locked position, locking teeth 25 engaging with teeth 26 of second fitting part 4.

It is further apparent that, in the illustrated position, cam 22 of safety bolt 10 comes to rest against step 53 of actuating cam 4, step 53 being provided by the radial offset between middle support surface 51 and outer support surface 50. Step 53 has a greater inclination than does the step provided between inner support surface 52 and middle support surface 51. This achieves an automatic interlock, so that safety bolt 10 may not be pushed farther to the outside by further rotation of driving element 30.

Due to the stop provided via step 52, fitting 1 according to FIG. 1 withstands high loads on the drive shaft in the closing direction.

Figure 3:
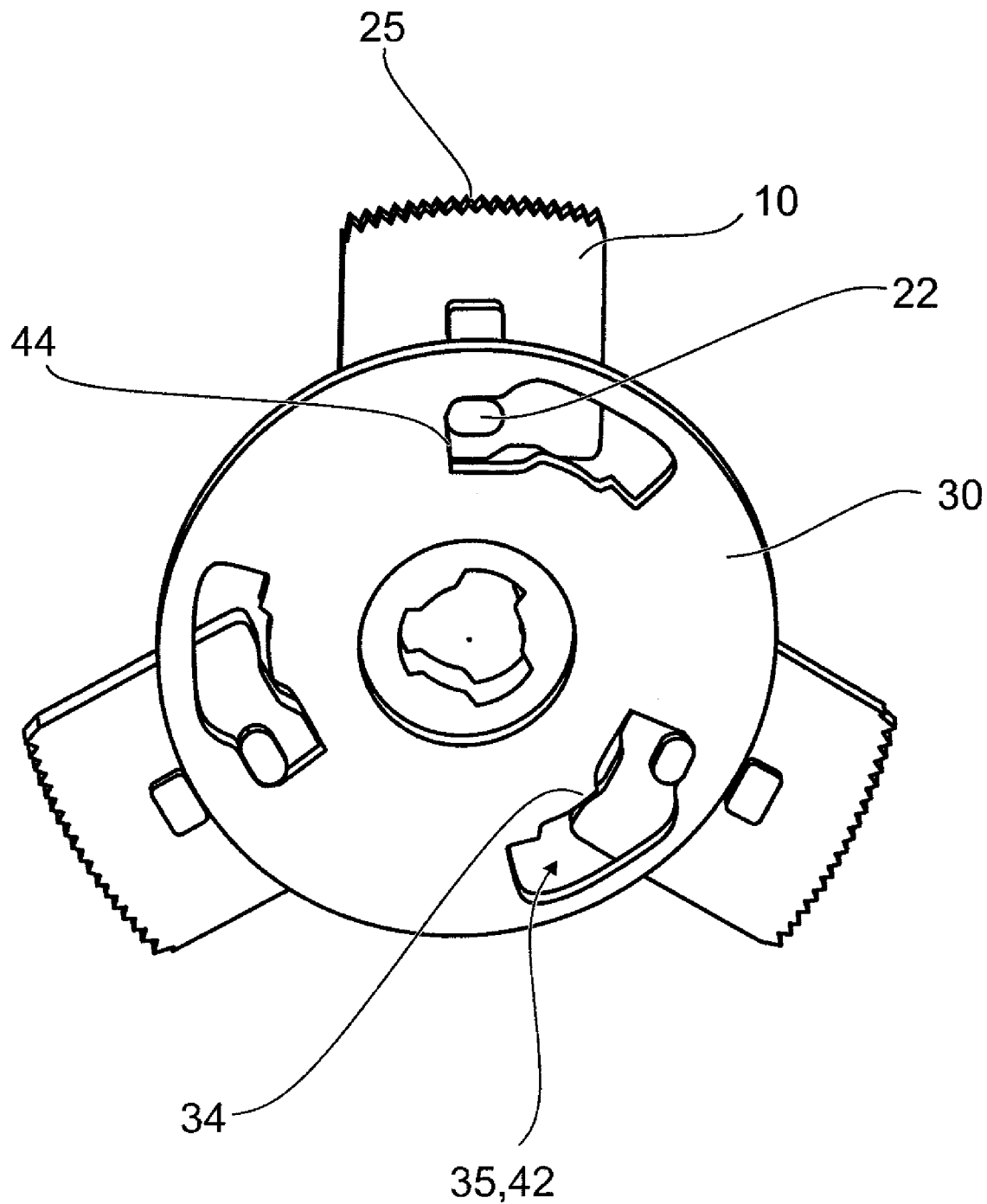
FIG. 3 shows a reduced representation of the position of a driving element in relation to a safety bolt in the released position.

FIG. 3, in turn, shows a reduced illustration of the position of driving element 30 according to FIG. 2 relative to safety bolt 10 when safety bolt 10 is pulled inwardly in the radial direction into its released position.

It is apparent that, in this case, trunnion 24 molded onto safety bolt 10 is supported on the outer limiting surface of respective links 35, 42. In particular, trunnions 24, and thus safety bolts 10, are pulled inward in the radial direction as a result of a radial offset of the outer limiting surfaces. At the same time, trunnions 24 each rest against radial limiting surface 44 of corresponding links 42. It is therefore not possible for driving element 30 to continue to turn in the clockwise direction. In particular, a fitting 1 designed in this manner also withstands loads on the drive shaft in the opening direction of actuation.

Figure 4:
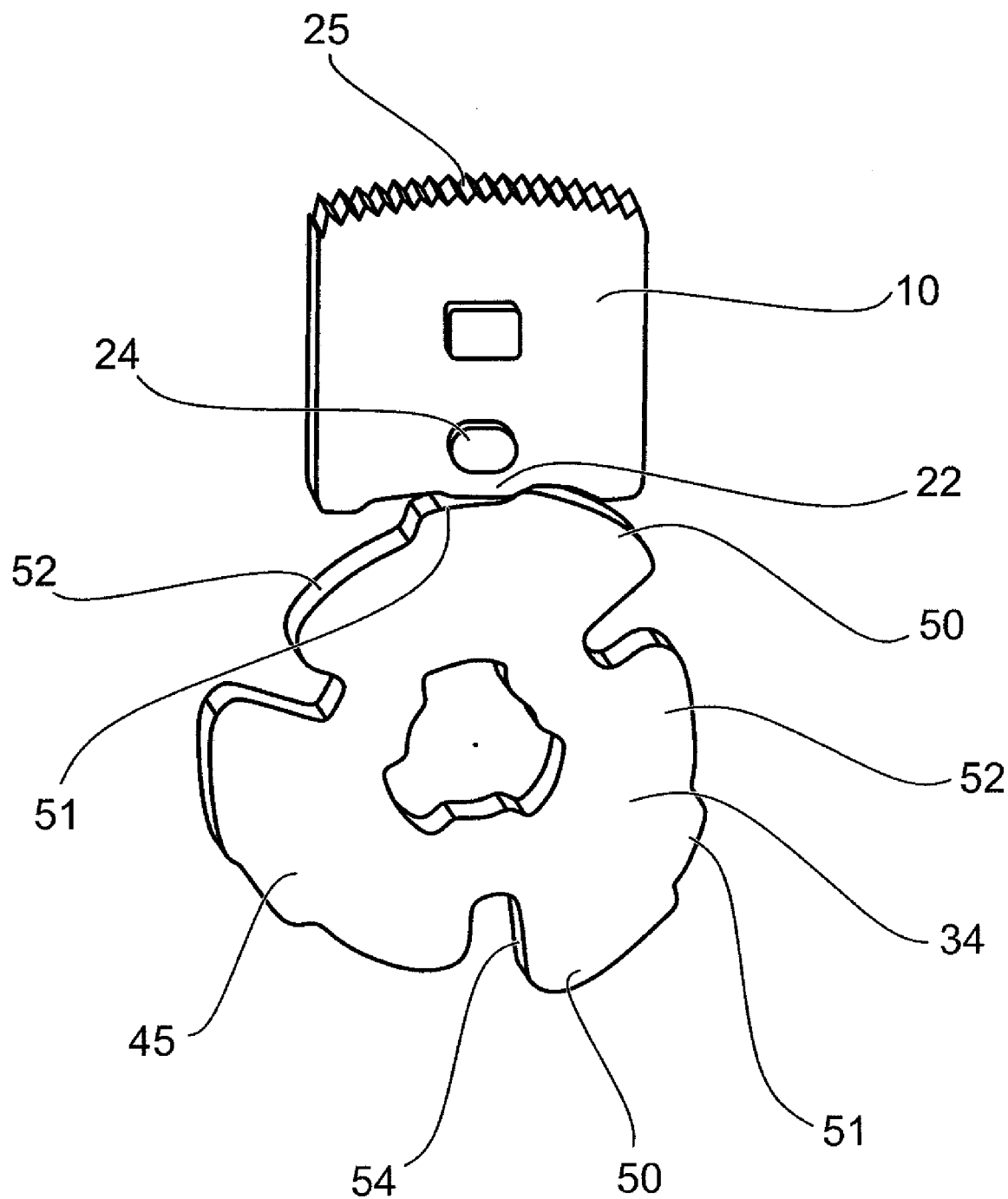
FIG. 4 shows a reduced representation of the position of a separate driving cam in relation to a safety bolt in the engaged position.

FIG. 4, in turn, shows a reduced representation of the position of a separate driving cam 45 relative to a safety bolt 10 in the relevant locked position. FIG. 4, which is otherwise comparable to FIG. 2 in terms of the position, shows that each actuating cam 34 of driving cam 45 is formed by an outer support surface 50, a middle support surface 51 and an inner support surface 52. Radial contact surface 54, with which an end of spring element 21 shown in FIG. 1 engages, is located on the edge of outer support surface 50. A pretension of driving cam 45 is achieved in the closing direction of actuation via the contact of the end of the spring element with radial contact surface 54. FIG. 4 shows once again how the stop for external support surface 50 against a cam 22 of safety bolt 10 is implemented for a separate driving cam 45.

Providing a separate driving cam 45 makes it possible to form two chirally oriented fittings 1 without requiring two variants of driving cam 45, by providing first fitting part 3 with a symmetrical design. Two chirally oriented fittings 1 are implemented by installing illustrated driving cam 45 in two positions that are rotated 180 degrees in relation to each other. In what is otherwise an equivalent structure, the directions of actuation are reversed.

Figure 5:
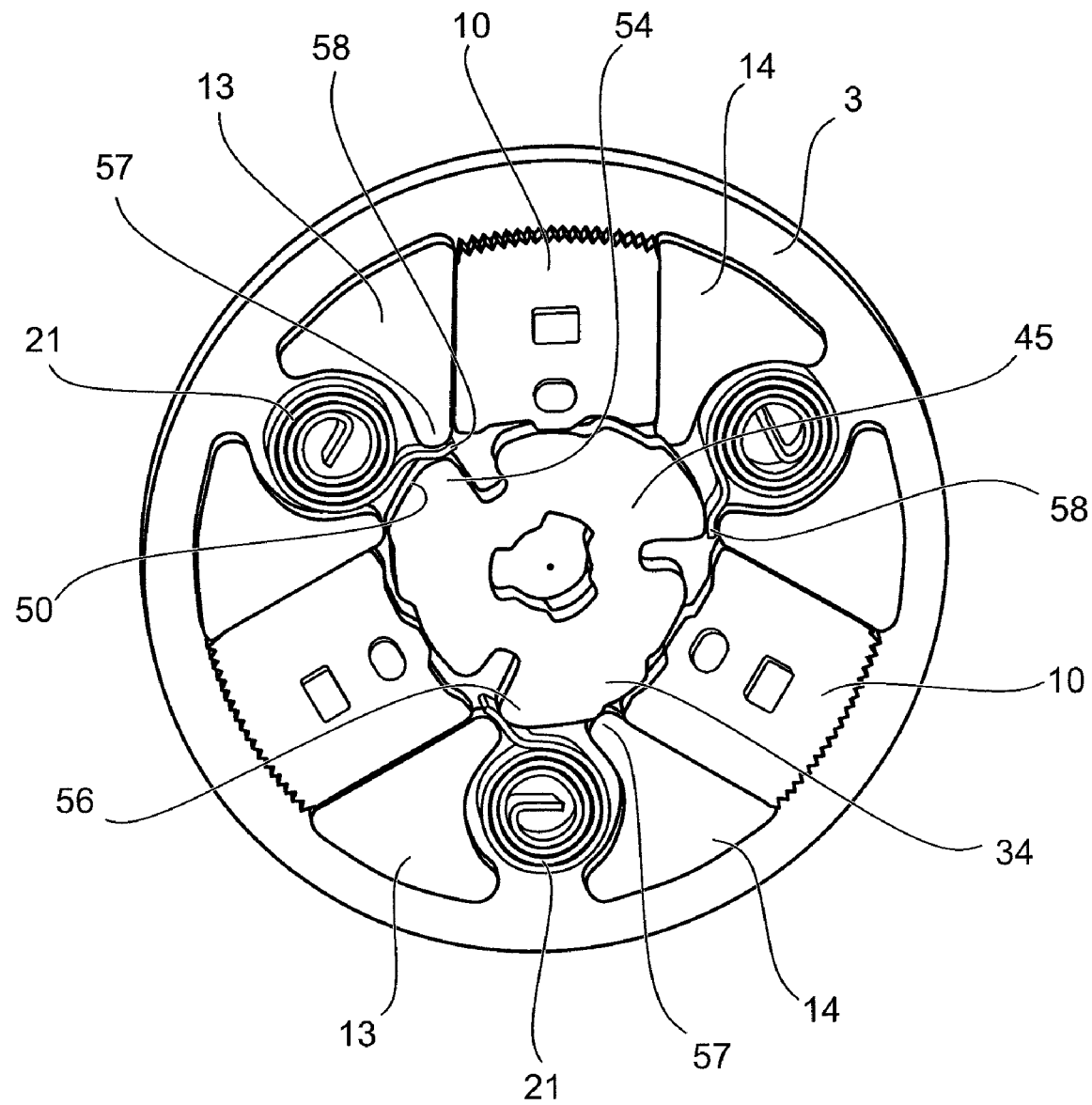
FIG. 5 shows a view of the first fitting part illustrating the position of the driving cam according to FIG. 4 in relation to the safety bolt in a stop position after the opening direction of actuation.

FIG. 5 shows the installation of separate driving cam 45 illustrated in FIG. 4 in first fitting part 3. FIG. 5 shows the position of driving cam 45 when a stop is achieved in the opening direction of actuation. It is apparent that, in each case, the outer support surface 50 merges with radial contact surface 54 via a radius 56 at the end of external support surface 50. When driving cam 45 moves in the clockwise direction, spring element end 58 of spring element 21, which rests against radial contact surface 54, is carried along, pressed to the outside radially thereby, and finally engages between internal end 57 of a guide element 13 and 14 and relevant limiting surface of driving cam 45. When a stop is achieved, spring element end 58 is clamped between an inner end 57 of a guide element 13, 14 and radius 56 between outer support surface 50 and radial contact surface 54 of a corresponding actuating cam 34. This produces a distribution of force and thereby avoids a single-point load between actuating cam 34 and guide elements 13, 14. In particular, spring elements 58 also have a curved contour, so that they rest snugly against inner ends 57 of guide elements 13, 14.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A fitting, in particular for a vehicle seat, which comprises a first fitting part and a second fitting part that is rotatable around a rotary axis relative to the first fitting part, and which comprises at least one safety bolt that is movably guided in the radial direction on the first fitting part for the purpose of forming an interlock with the second fitting part, the safety bolt including a cam on its radially inside end, and at least one rotatable actuating cam being provided for radially supporting the safety bolt via the safety bolt cam, wherein the actuating cam includes outer, middle and inner support surfaces, running in the circumferential direction, the support surfaces each having a radial offset relative to each other, and the inner support surface supporting the safety bolt along a first portion of the safety bolt cam in a released position and the middle support surface supporting the safety bolt along a second portion of the safety bolt cam in a locked position, the first portion of the safety bolt cam at least partially overlapping the second portion of the safety bolt cam;

a step between the middle and the outer support surfaces is designed as a stop configured to engage the safety bolt and prevent over-rotation of the actuating cam.

2. The fitting according to claim 1, wherein the safety bolt is guided in parallel between a first and a second guide element on the first fitting part, the two guide elements having a mirror-symmetrical design in relation to each other, the actuating cam further including a radial contact surface provided adjacent to the outer support surface of the actuating cam, the radial contact surface forming a stop which engages a radially inside end of one of the guide elements.

3. The fitting according to claim 2, wherein a spring element end for pretensioning the actuating cam engages with the radial contact surface.

4. The fitting according to claim 3, wherein the outer support surface merges with the radial contract surface at a transition area, such that the spring element end is located between the end of the guide element and transition area upon achieving a stop.

5. The fitting according to claim 2, wherein the radially inside ends of the guide elements are closer to the rotary axis than inner ends of the safety bolt.

6. The fitting according to claim 1, wherein a rotatably mounted engagement component is provided for retracting the safety bolt via a correspondingly designed matching piece of the safety bolt.

7. The fitting according to claim 6, wherein the engagement component is designed as a link carrying the safety bolt.

8. The fitting according to claim 7, wherein the link includes a radial limiting surface, which acts as a stop in interaction with the safety bolt by preventing over-rotation of the fitting elements relative to each other.

9. The fitting according to claim 6, wherein the engagement component and the actuating cam are situated together on a base member of a driving element.

10. The fitting according to claim 9, wherein the engagement component and the actuating cam are situated on the base member at a distance from each other in the axial direction.

11. The fitting according to claim 10, wherein the engagement component and the actuating cam at least partially overlap in the radial direction.

12. The fitting according to claim 9, wherein the base member has an elevated base that is formed by the radial area of the actuating cam.

13. The fitting according to claim 1, wherein multiple, uniformly designed actuating cams are provided in the circumferential direction, which interact with multiple safety bolts distributed in the circumferential direction.

14. The fitting according to claim 1, wherein the first portion of the safety bolt cam completely overlaps the second portion of the safety bolt cam such that the inner and middle support surfaces support the safety bolt along the same portion of the safety bolt cam in their respective positions.

* * * * *